United States Patent
Yates et al.

(10) Patent No.: US 10,241,204 B2
(45) Date of Patent: Mar. 26, 2019

(54) METHOD FOR ILLUMINATING AN OBJECT

(71) Applicant: ODOS IMAGING LTD., Edinburgh (GB)

(72) Inventors: Chris Yates, Edinburgh (GB); Chris Softley, Gorebridge (GB)

(73) Assignee: ODOS IMAGING LTD., Edinburgh (GB)

( * ) Notice: Subject to any disclaimer, the term of this patent is extended or adjusted under 35 U.S.C. 154(b) by 457 days.

(21) Appl. No.: 15/154,639

(22) Filed: May 13, 2016

(65) Prior Publication Data

US 2016/0252618 A1    Sep. 1, 2016

Related U.S. Application Data

(63) Continuation of application No. PCT/EP2014/074484, filed on Nov. 13, 2014.

(30) Foreign Application Priority Data

Nov. 14, 2013    (DE) .................. 10 2013 112 553

(51) Int. Cl.
*G01C 3/08* (2006.01)
*G01S 17/10* (2006.01)
(Continued)

(52) U.S. Cl.
CPC ............ *G01S 17/10* (2013.01); *G01S 7/4865* (2013.01); *G01S 17/936* (2013.01); *G01S 7/4915* (2013.01); *G01S 17/32* (2013.01)

(58) Field of Classification Search
CPC ...... G01S 17/10; G01S 7/4865; G01S 17/936; G01S 7/4915; G01S 17/32
See application file for complete search history.

(56) References Cited

U.S. PATENT DOCUMENTS 3,857,064 A * 12/1974 Vital ................. G03B 7/16
                                                            315/241 P
4,035,760 A *  7/1977 Asbury ............. G01S 13/585
                                                            342/109

(Continued)

FOREIGN PATENT DOCUMENTS

CN        1410826 A      4/2003
CN        1834687 A      9/2006

(Continued)

OTHER PUBLICATIONS

Office Action issued in Chinese Patent Application No. CN 201480072983.8, dated Feb. 13, 2018 and English language translation thereof.

(Continued)

*Primary Examiner* — Samantha K Abraham
(74) *Attorney, Agent, or Firm* — Ewers & Hasselmann PLLC

(57) ABSTRACT

A method is provided for illuminating an object and for determining a distance value R. The object is illuminated with a light source and the light intensity of the light source is switched at a time $T_0$ from an intensity $I_{out,h}$ to an intensity $I_{out,l}$ being lower than $I_{out,h}$ and switched back to $I_{out,h}$ at a time $T_0+T_n$. A signal value U is outputted at the end of an integration window time period which has such a predetermined delay relative to $T_0$ that either $T_{tof}$ or $T_{tof}+T_n$ is between an integration start point in time $T_{sd}$ of the integration window time period and an integration end point in time $T_{sd}+T_s$, with $T_{tof}$ being a point in time when light with the intensity $I_{in,l}$ arrives first at the photo element, and $T_s$ is longer than $T_n$.

20 Claims, 4 Drawing Sheets

(51) Int. Cl.
*G01S 17/93* (2006.01)
*G01S 7/486* (2006.01)
*G01S 17/32* (2006.01)
*G01S 7/491* (2006.01)

(56) References Cited

U.S. PATENT DOCUMENTS

| | | | | |
|---|---|---|---|---|
| 4,155,004 A * | 5/1979 | Schulz | ............... | E21D 23/00 |
| | | | | 250/201.7 |
| 4,164,686 A * | 8/1979 | Vital | ............... | G03B 15/03 |
| | | | | 315/151 |
| 4,249,109 A * | 2/1981 | Ogawa | ............... | G03B 15/05 |
| | | | | 250/214 DC |
| 4,290,683 A * | 9/1981 | Bagdis | ............... | G03B 7/16 |
| | | | | 396/105 |
| 4,329,031 A * | 5/1982 | Carcia | ............... | G03B 7/16 |
| | | | | 396/105 |
| 4,346,971 A * | 8/1982 | Johnson | ............... | G03B 7/16 |
| | | | | 396/105 |
| 4,375,322 A * | 3/1983 | Coppa | ............... | G03B 7/16 |
| | | | | 396/105 |
| 4,390,897 A * | 6/1983 | Smithgall, Sr. | ............... | C03C 25/18 |
| | | | | 250/550 |
| 4,952,050 A * | 8/1990 | Aizu | ............... | A61B 3/1233 |
| | | | | 351/206 |
| 5,023,647 A * | 6/1991 | Shiomi | ............... | G03B 7/16 |
| | | | | 396/89 |
| 6,064,759 A * | 5/2000 | Buckley | ............... | G01B 11/024 |
| | | | | 348/125 |
| 6,096,272 A * | 8/2000 | Clark | ............... | G01N 21/253 |
| | | | | 422/64 |
| 6,373,557 B1 | 4/2002 | Mengel et al. | | |
| 6,647,205 B1 | 11/2003 | Kindaichi et al. | | |
| 7,212,278 B2 | 5/2007 | Doemens et al. | | |
| 8,203,330 B2 * | 6/2012 | Ansay | ............... | G01B 7/14 |
| | | | | 324/207.11 |
| 8,699,008 B2 | 4/2014 | Murakami et al. | | |
| 2004/0008394 A1* | 1/2004 | Lange | ............... | G01S 7/4816 |
| | | | | 359/237 |
| 2004/0056966 A1* | 3/2004 | Schechner | ............... | H04N 5/2254 |
| | | | | 348/229.1 |
| 2004/0151345 A1* | 8/2004 | Morcom | ............... | G01S 7/487 |
| | | | | 382/104 |
| 2004/0175174 A1* | 9/2004 | Suhami | ............... | G02F 7/00 |
| | | | | 398/43 |
| 2006/0214121 A1 | 9/2006 | Schrey et al. | | |
| 2007/0165130 A1* | 7/2007 | Cobben | ............... | G02B 26/005 |
| | | | | 348/335 |
| 2008/0144000 A1 | 6/2008 | Thun et al. | | |
| 2008/0225263 A1* | 9/2008 | Albers | ............... | G01S 7/4008 |
| | | | | 356/4.01 |
| 2010/0277779 A1* | 11/2010 | Futterer | ............... | G02F 1/1335 |
| | | | | 359/9 |
| 2011/0051118 A1* | 3/2011 | Sato | ............... | G01S 7/491 |
| | | | | 356/4.07 |
| 2011/0062888 A1* | 3/2011 | Bondy | ............... | H05B 33/0815 |
| | | | | 315/294 |
| 2011/0122467 A1* | 5/2011 | Futterer | ............... | G02F 1/133524 |
| | | | | 359/9 |
| 2012/0206064 A1* | 8/2012 | Archenhold | ............... | H05B 33/0812 |
| | | | | 315/297 |
| 2012/0214246 A1* | 8/2012 | Oldham | ............... | G01J 1/42 |
| | | | | 436/94 |
| 2012/0268727 A1* | 10/2012 | Schrey | ............... | G01S 7/487 |
| | | | | 356/5.01 |
| 2013/0306730 A1* | 11/2013 | Brady | ............... | G06K 7/10792 |
| | | | | 235/455 |
| 2013/0314711 A1* | 11/2013 | Cantin | ............... | G01S 17/10 |
| | | | | 356/445 |
| 2015/0144698 A1* | 5/2015 | Teng | ............... | G06K 7/10594 |
| | | | | 235/462.1 |
| 2015/0234038 A1 | 8/2015 | Yates et al. | | |

FOREIGN PATENT DOCUMENTS

| | | |
|---|---|---|
| CN | 102378920 A | 3/2012 |
| DE | 19741887 A1 | 3/1999 |
| DE | 198 33 207 A1 | 2/2000 |
| DE | 102007046562 A1 | 4/2009 |
| DE | 10 2011 081 384 A1 | 2/2013 |
| WO | 2014068061 A1 | 5/2014 |

OTHER PUBLICATIONS

International Search Report dated Feb. 18, 2015 of international application PCT/EP2014/074484 on which this application is based.
U.S. Appl. No. 15/599,110, filed May 18, 2017, Chris Yates et al.
U.S. Appl. No. 15/611,749, filed Jun. 1, 2017, Chris Yates et al.
Office Action issued in European Patent Application No. EP 14801984.7, dated May 16, 2018 in English.

* cited by examiner

METHOD FOR ILLUMINATING AN OBJECT

CROSS REFERENCE TO RELATED APPLICATIONS

This application is a continuation application of international patent application PCT/EP2014/074484, filed Nov. 13, 2014, designating the United States and claiming priority from German application 10 2013 112 553.0, filed Nov. 14, 2013, and the entire content of both applications is incorporated herein by reference.

FIELD OF THE INVENTION

The invention relates to a method for illuminating an object.

BACKGROUND OF THE INVENTION

Distance values between a measuring device and an object can be measured by using optical methods without a physical contact between the device and the object. In these methods, the object is illuminated by the measuring device and the light is reflected back from the object and captured by a light detector of the measuring device.

Distance values can be determined for example by periodically modulating the intensity of the light which is emitted from the measuring device and by measuring a phase difference between the emitted light and the light reflected back and arriving at the detector. However, due to the periodicity of the light intensity, this method results in an ambiguous distance measurement.

SUMMARY OF THE INVENTION

Unambiguous distance values can be determined by measuring the "time of flight" between the emission of the light and the arrival of the back reflected light at the detector.

In certain situations, it is required to illuminate a scene such that it becomes visible for the human eye, or for other additional vision systems. This illumination of the scene, however, can interfere with an optical distance measurement, whereby the precision of the optical distance measurement is reduced.

It is an object of the invention to provide an illumination device and a method for illuminating the object, wherein a distance measurement with a high precision can be carried out.

According to a first aspect of the invention, a method for illuminating an object with an illumination device and for determining a distance value R between the object and the illumination device is provided which allows the object to be viewed by a human user with an unaided eye or with another vision system.

The illumination device includes a light source configured for illuminating the object and at least one photo element. The photo element is configured to capture the light emitted by the light source after being reflected back from the object, to be activated during a temporal integration window time period and to output a signal value U at the end of the integration window with the signal value U being proportional to the energy of light arriving at the photo element during its activation.

The method includes the steps of: a) illuminating the object with the light source and switching the light intensity of the light source at a point in time $T_0$ from an intensity $I_{out,h}$ to an intensity $I_{out,l}$ being lower than $I_{out,h}$ as well as switching its intensity at a point in time $T_0+T_n$ back to $I_{out,h}$, wherein the light arriving on the photo element that corresponds to the emitted intensity $I_{out,h}$ has an intensity $I_{in,h}$ and the light arriving on the photo element that corresponds to the emitted intensity $I_{out,l}$ has an intensity $I_{in,l}$, a1) measuring the intensity $I_{in}=I_{in,h}-I_{in,l}$ by the photo element by measuring a signal value $U_2$ during a second integration window time period, b) outputting a signal value U at the end of the integration window time period by the photo element, wherein the integration window time period has such a predetermined delay to $T_0$ that either $T_{tof}$ or $T_{tof}+T_n$ is between an integration start point in time $T_{sd}$ of the integration window time period and an integration end point in time $T_{sd}+T_s$ of the integration window time period, with $T_{tof}$ being the point in time when light with the intensity $I_{in,l}$ arrives first at the photo element, wherein $T_s$ is longer than $T_n$, and c) calculating the distance value R from U and $I_{in}$.

According to a second aspect of the invention, a second method is provided for illuminating an object by an illumination device for a human user, or for another vision system, to be able to view the object with an unaided eye, and for determining a distance value R between the object and the illumination device. The illumination device includes a light source configured for illuminating the object, and at least one photo element configured to capture the light emitted by the light source after being reflected back from the object, to be activated during a temporal integration window time period and to output a signal value U at the end of the integration window time period with the signal value U being proportional to the energy of the light arriving at the photo element during its activation.

The method includes the steps of: a) illuminating the object with the light source and switching the light intensity of the light source at a point in time $T_0$ from an intensity $I_{out,h}$ to an intensity $I_{out,l}$ being lower than $I_{out,h}$ as well as switching its intensity at a point in time $T_0+T_n$ back to $I_{out,h}$, wherein the light arriving at the photo element that corresponds to the emitted intensity $I_{out,h}$ has an intensity $I_{in,h}$ and the light arriving at the photo element that corresponds to the emitted intensity $I_{out,l}$ has an intensity $I_{in,l}$, b) outputting a signal value U at the end of the integration window time period of the photo element, wherein the integration window time period has such a predetermined delay to $T_0$ that either $T_{tof}$ or $T_{tof}+T_n$ is between an integration start point in time $T_{sd}$ of the integration window time period and an integration end point in time $T_{sd}+T_s$ of the integration window time period, with $T_{tof}$ being the point in time when light with the intensity $I_{in,l}$ arrives first at the photo element, wherein $T_s$ is longer than $T_n$, b1) outputting a signal value $U_2$ at the end of a second integration window time period having an integration start point in time $T_{sd2}$ being later than $T_{sd}$ and an integration end point in time $T_{sd2}+T_s$, wherein $T_{tof}$ is between $T_{sd2}$ and $T_{sd}+T_s$ and wherein $T_{tof}+T_n$ is later than $T_{sd2}+T_s$, or outputting a signal value $U_2$ at the end of a second integration window time period having an integration start point in time $T_{sd2}$ being later than $T_{sd}$ and an integration end point in time $T_{sd2}+T_s$, wherein $T_{tof}+T_n$ is between $T_{sd2}$ and $T_{sd}+T_s$, and wherein $T_{tof}$ is earlier than $T_{sd}$, and c) calculating the distance value R from U and $U_2$.

According to a third aspect of the invention, a method for illuminating an object and for determining a distance value R between the object and an illumination device is provided in which a human user, or another vision system, is able to view the object with an unaided eye. The illumination device includes a light source configured for illuminating the object and at least one photo element that is configured to capture the light emitted by the light source after being reflected back from the object, to be activated during a temporal integration window time period and to output a signal value U at the end of the integration window time period with the signal value U being proportional to the energy of light arriving at the photo element during its activation, and for determining a distance value R between the object and the illumination device.

The method includes the steps of: a) illuminating the object with the light source and switching the light intensity of the light source at a point in time $T_0$ from an intensity $I_{out,h}$ to an intensity $I_{out,l}$ being lower than $I_{out,l}$ as well as switching its intensity at a point in time $T_0+T_n$ back to $I_{out,h}$, wherein the light arriving on the photo element that corresponds to the emitted intensity $I_{out,h}$ has an intensity $I_{in,h}$ and the light arriving on the photo element that corresponds to the emitted intensity $I_{out,l}$ has an intensity $I_{in,l}$, a1) illuminating the object with the light source and switching the intensity of the light source at a plurality of points in time $T_0$ and a plurality of points in time $T_0+T_n$, b) outputting a signal value U at the end of the integration window time period of the photo element, wherein the integration window time period has such a predetermined delay to $T_0$ that either $T_{tof}$ or $T_{tof}+T_n$ is between an integration start point in time $T_{sd}$ of the integration window time period and an integration end point in time $T_{sd}+T_s$ of the integration window time period, with $T_{tof}$ being the point in time when light with the intensity $I_{in,l}$ arrives first at the photo element, wherein $T_s$ is longer than $T_n$, b1) forming a correlation function $f_c$ out of the intensity of the light arriving at the photo element and the integration window time period by varying the delay D of the integration window time period with respect to $T_0$, and c) calculating the distance value from the correlation function.

The signal value U can be measured directly, for example, if a CCD chip or CMOS image sensor is used. The charge measured at the end of the integration window time period is proportional to the energy of the light arriving at the photo element during its activation and therefore the signal value U, which is proportional to the charge, is proportional to the energy of the light. On the other hand, the signal value U can be determined indirectly if the relation between a measured value and the energy of the light arriving at the photo element during its activation is known. For example, if the photo element includes a condenser that is discharged via a photodiode during the activation of the photo element the measured value is a voltage that is approximately inversely proportional to the energy of the light arriving at the photo element during its activation.

The light emitted by the light source is used for both illuminating the object to make it visible for the human eye, or for other vision systems, and determining the distance value R between the object and the illumination device. Since the light source is used for both illuminating the scene and measuring the distance, an extra light source that would interfere with the distance measurement needs advantageously not be provided. Due to the lack of the extra light source, the amount of unwanted background light arriving at the photo element is reduced, whereby the distance value R can be determined with a high precision.

The duration $T_s$ of the integration window time period is longer than the duration $T_n$, during which the light source emits with the lower intensity $I_{out,l}$. Therefore, photo elements can be used that only enable integration window time periods to be longer than $T_n$. Such photo elements are advantageously more cost-efficient than photo elements that enable integration window time periods being shorter than or equal to $T_n$.

Background radiation, for example sun-light, leads to an error in the determination of the distance R. If the duration $T_s$ of the integration window time period is increased, the amount of the background radiation that is captured during the integration is increased. At the same time, the amount of light that is emitted by the light source, that is subsequently reflected back from the object, and that is arriving during the integration window time period is increased. The background radiation leads to an error in the determination of the distance R but this error is not increased if the duration $T_s$ of the integration window time period is increased. That the error is not increased if the duration $T_s$ is increased is not the case when for illuminating the object a light pulse is used. In the case the light pulse is used, only the amount of background radiation that arrives at the photo element during the integration window time period is increased by increasing the duration $T_s$. Therefore, in case the light pulse is used and the duration $T_s$ is increased, this leads to an increase of the error for the determination of the distance R.

According to the third aspect of the invention, the effect of making $T_s$ longer than $T_n$ results in the minimum in the correlation function being a plateau. This is not the case if $T_s$ is equal to $T_n$, because in this case the minimum consists only of a single point. The plateau is advantageous because two points of the correlation function, namely the two points that confine the plateau, can be evaluated for determining the distance. In case that the minimum consists of a single point, only the single point can be evaluated for determining the distance. Therefore, in the case that $T_s$ is longer than $T_n$, the distance R can be determined with a high precision.

The light source of the illumination device can be, for example, the headlamps of an automobile whose primary purpose is to illuminate the road, but at the same time the headlamps can be used to measure the distance to another automobile being in front of the automobile. The distance between both automobiles can possibly be used as an input to an intelligent anti-collision system.

The duration $T_n$ during which the intensity of the light source is reduced from $I_{out,h}$ to $I_{out,l}$ is in the order of nanoseconds or picoseconds and therefore the duration $T_n$ is so fast that the switching of the light intensity can advantageously not be perceived by the human eye, or by other vision systems with response times greater than these timescales. Furthermore, the illumination of the object is not required to be constant; a modulated light source, for example, with a frequency of 50 or 60 Hz, can also be used.

According to an aspect of the invention, light sources are light emitting diodes, VCSELs (vertical-cavity surface-emitting laser) and/or lasers. The illumination device includes a CCD chip with an image intensifier and/or a CMOS chip that include the at least one photo element. According to a further aspect of the invention, the illumination device includes a single photo element, a linear array of photo elements or a two dimensional array of photo elements.

According to yet another aspect of the invention, $I_{out,l}$ is zero. With $I_{out,l}$ being zero, the energy of light arriving at the photo element during its activation is reduced and the signal value U can be determined with a high dynamic. With the high dynamic of the signal value U, a high precision for the determination of the distance value R can be achieved.

According to the first aspect of the invention, it is possible to measure U and $U_2$ either consecutively by using for both measurements one photo element or to measure U and $U_2$ simultaneously by using two photo elements. The two photo elements can be arranged adjacent to one another. Alternatively, it is possible to split the incoming light by a beam splitter and to direct each split portion of the light onto a respective photo element.

According to the first aspect of the invention, the second integration window time period has such a delay relative to $T_0$ that the integration end point in time $T_{sd2}+T_{s2}$ is earlier than $T_{tof}$ or the integration start point in time $T_{sd2}$ is later than $T_{tof}+T_n$. From the known duration $T_{s2}$ of the second integration window time period and the signal value $U_2$, it is possible to calculate the difference in intensity $I_{in}$ between the light arriving at the photo element that corresponds to the lower level and the light arriving on the photo element that corresponds to the higher level. If $I_{in,l}$ is zero, one can directly calculate $I_{in}$ by $$I_{in} = \frac{U_2}{T_{s2}}. \qquad (eq.\ 1)$$

If $I_{in,l}$ is non-zero, $I_{in}$ is calculated from $I_{in}=U_2/T_{s2}-I_{in,l}$ and the known ratio $I_{out,h}/I_{out,l}=I_{in,h}/I_{in,l}$ which results in $$I_{in} = \frac{U_2}{T_{s2}}\left(1 - \frac{I_{out,l}}{I_{out,h}}\right). \qquad (eq.\ 2)$$

Alternatively, according to the first aspect of the invention, the second integration window time period has such a delay relative to $T_0$ that the integration start point in time $T_{sd2}$ is earlier than $T_{tof}$ and the integration end point in time $T_{sd2}+T_{s2}$ is later than $T_{tof}+T_n$. The intensity $I_{in}$ can be analogously determined by using the known duration of the second integration window time period $T_{s2}$ and the duration $T_n$, during which the intensity is switched to lower intensity level and the known ratio $I_{out,h}/I_{out,l}=I_{in,h}/I_{in,l}$.

In the case that $T_{tof}+T_n$ is between $T_{sd}$ and $T_{sd}+T_s$ and under the assumption that $I_{in,l}$ is zero, $T_{tof}$ can be calculated by $$T_{tof} = T_{sd} + T_s - T_n - \frac{U}{I_{in}}. \qquad (eq.\ 3)$$

In the case that $T_{tof}$ is between $T_{sd}$ and $T_{sd}+T_s$ and under the assumption that $I_{in,l}$ is zero, $T_{tof}$ can be calculated by $$T_{tof} = T_{sd} + \frac{U}{I_{in}}. \qquad (eq.\ 4)$$

According to the second aspect of the invention, $T_s$ is identical for both the first and the second integration window time period. In the case that $T_{tof}$ is between $T_{sd2}$ and $T_{sd}+T_s$ and $T_{tof}+T_n$ is later than $T_{sd2}+T_s$, $T_{tof}$ can be calculated by:

$$T_{tof} = -U\frac{T_{sd2}-T_{sd}}{U_2-U} + T_{sd}. \qquad (eq.\ 5)$$

In the case that $T_{tof}+T_s$ is between $T_{sd2}$ and $T_{sd}+T_s$ and $T_{tof}$ is earlier than $T_{sd}$, $T_{tof}$ can be calculated by:

$$T_{tof} = -U\frac{T_{sd2}-T_{sd}}{U_2-U} + T_{sd} + T_s - T_N. \qquad (eq.\ 6)$$

In both cases according to the second aspect of the invention, it is possible to measure U and $U_2$ either consecutively by using one photo element for both measurements or to measure U and $U_2$ simultaneously by using two photo elements. The two photo elements can be arranged adjacent to one another. Alternatively, it is possible to split the incoming light by a beam splitter and to direct each split portion of the light onto a respective photo element.

According to the third aspect of the invention, a correlation function $f_c$ is defined as $$f_c(D) = \int_{-\infty}^{+\infty} I(t)g(t+D)dt, \qquad (eq.\ 7)$$

wherein $I(t)$ is a temporal dependent intensity of the light arriving at the photo element and $g(t)$ is the integration window time period.

According to the third aspect of the invention, the distance value R is preferably determined from at least one of the points of the correlation function $f_c$ that correspond to $T_{sd}+T_s$ being equal to $T_{tof}$, $T_{sd}+T_s$ being equal $T_{tof}+T_n$, $T_{sd}$ being equal to $T_{tof}$ and $T_{sd}$ being equal $T_{tof}+T_n$.

According to the third aspect of the invention, the distance value R is preferably determined from the arithmetic average of a plurality of points or of all of the points of the correlation function $f_c$ that correspond to $T_{sd}+T_s$ being equal to $T_{tof}$, $T_{sd}+T_s$ being equal $T_{tof}+T_n$, $T_{sd}$ being equal to $T_{tof}$ and $T_{sd}$ being equal $T_{tof}+T_n$. By forming the average of a plurality of points, the precision for the determination of the distance value R can be increased.

From each of the determined values $T_{tof}$, the distance value R can be determined by $$R=0.5*c*T_{tof} \qquad (eq.\ 8),$$

wherein c is the speed of light in the medium in which the illumination device is operated.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
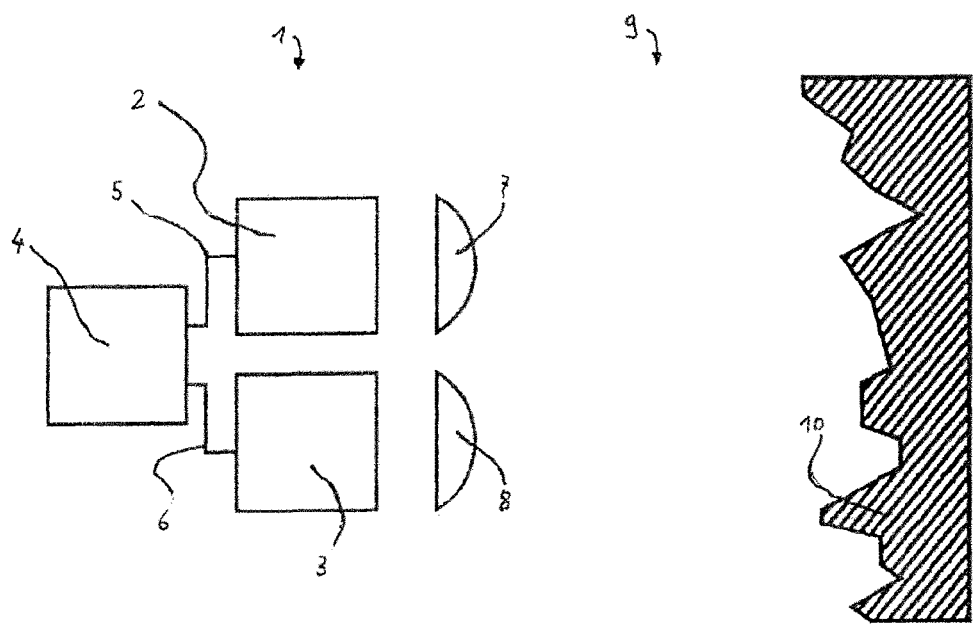
FIG. 1 shows a schematic cross section through an illumination device according to a first and a second example embodiment of the invention.
Figure 4:
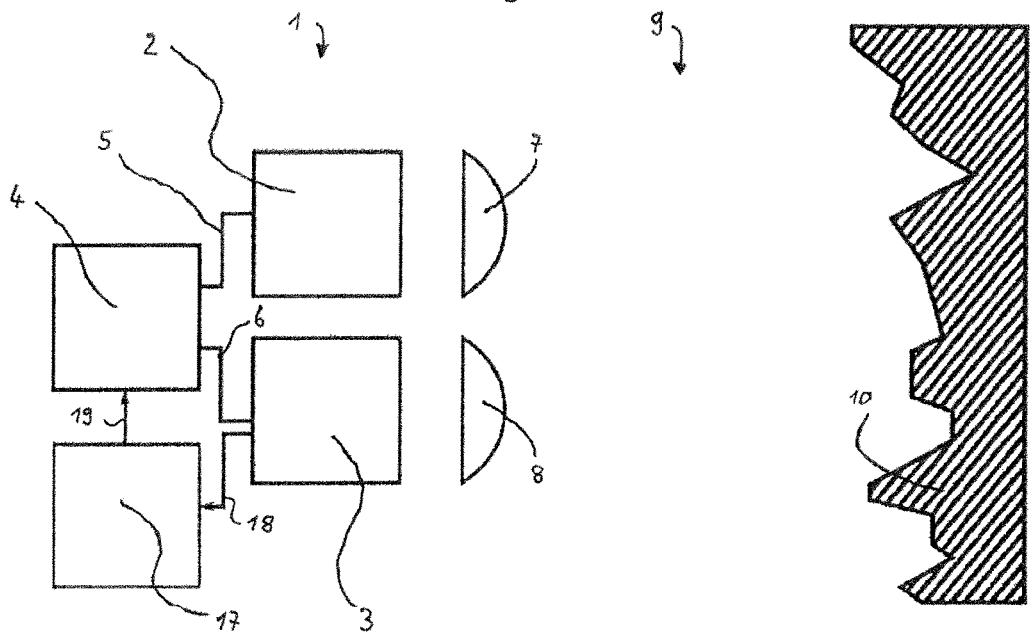
FIG. 4 shows a schematic cross section through an illumination device according to a third example embodiment of the invention.

FIGS. 1 and 4 show an illumination device 1 that includes a light source 2, a photo element 3 and a trigger generator 4. The trigger generator 4 provides an activation signal 5 for switching the intensity of the light source 2 between two different intensities $I_{out,h}$ and $I_{out,l}$ wherein $I_{out,l} < I_{out,h}$. The intensity $I_{out,h}$ is chosen such that an object 10 is illuminated such that it can be seen with an unaided eye. Alternatively, the intensity $I_{out,h}$ is chosen such that it can be seen by another vision system. Detection optics 8 are arranged in front of the photo element 3 in order to image a field of view 9 onto the photo element 3. Illumination optics 7 are arranged in front of the light source 2 in order to shape the light emitted by the light source 2 such that the field of view 9 can be illuminated by the light source 2. The illumination device 1 is adapted such that the light emitted by light source 2 impinges onto an object 10 placed within the field of view 9, is reflected back from the object 10 and arrives at the photo element 3 after being reflected back from the object 10. The illumination optics 7 and the detection optics 8 are preferably respective lenses. It is also possible to use a single lens for both the illumination optics 7 and the detection optics 8.

Figure 2:
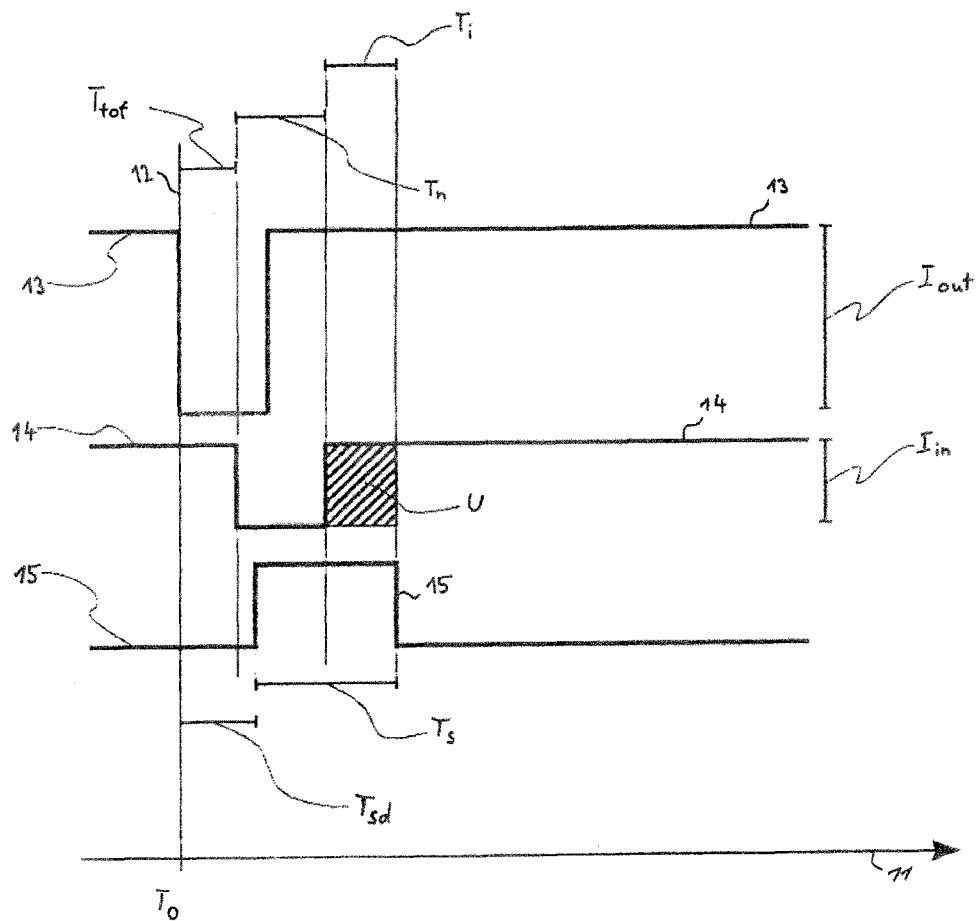
FIG. 2 shows temporal profile diagrams with intensities and an integration window time period according to the first and second example embodiment of the invention.
Figure 3:
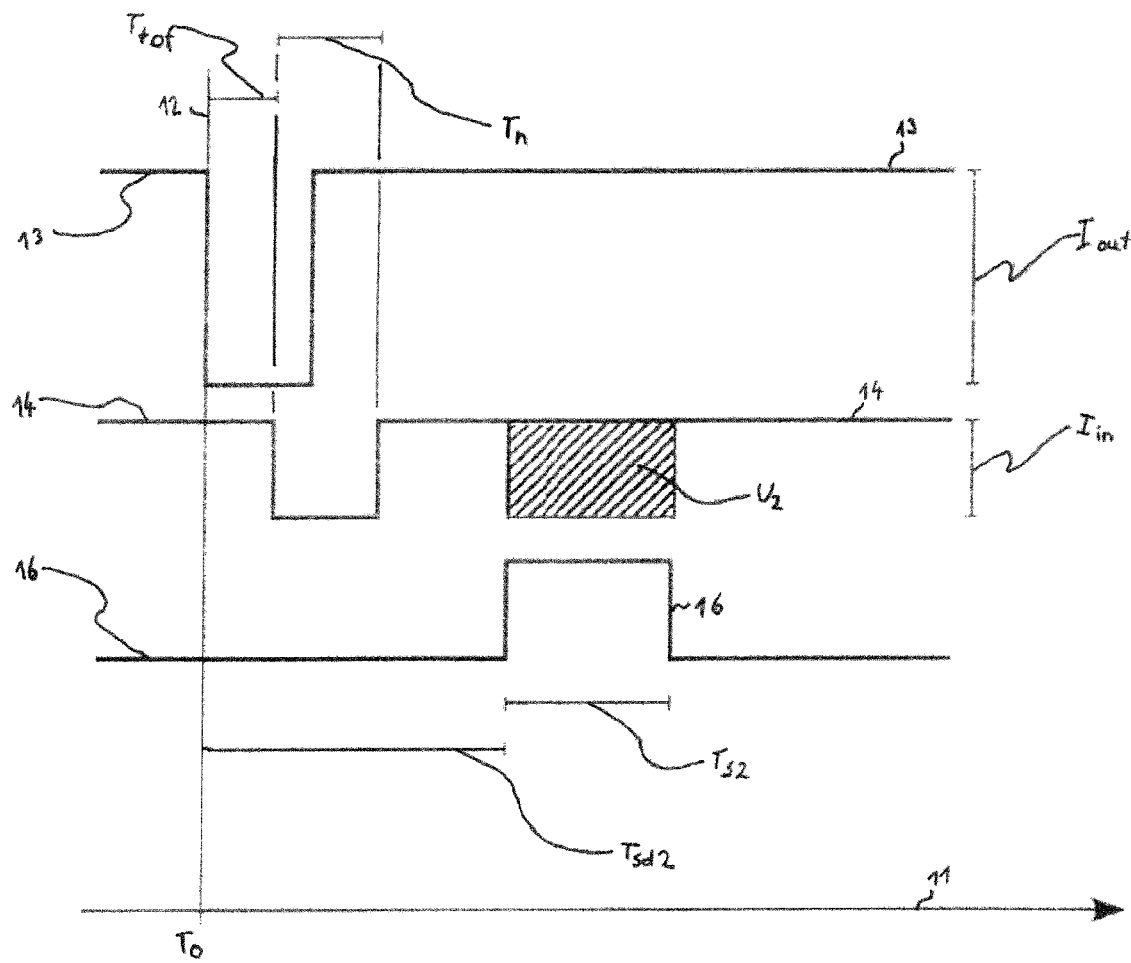
FIG. 3 shows temporal profile diagrams with intensities and an integration window time period according to the first example embodiment of the invention.

In a first example embodiment according to FIGS. 1 to 3, the trigger generator 4 provides an activation signal 6 for activating the photo element 3 during a first temporal integration window time period 15 and during a second temporal integration window time period 16. The photo element 3 is configured to output a signal value U that is proportional to the energy of light arriving on the photo element 3 during the first integration window time period 15 and to output a signal value $U_2$ that is proportional to the energy of light arriving at the photo element 3 during the second integration window time period 16.

In FIGS. 2 and 3, two temporal profile diagrams are shown in which the intensity 12 is plotted versus the time 11. Shown in both diagrams are the intensity 13 of the light emitted by the light source 2 and the intensity 14 of the light arriving on the photo element 3, wherein the intensity 14 is lower than the intensity 13. The trigger generator 4 provides the activation signal 5 such that the light source 2 switches its intensity at a point in time $T_0$ from $I_{out,h}$ to $I_{out,l}$ and at a point in time $T_0+T_n$ from $I_{out,l}$ to $I_{out,h}$. The intensity 14 of the light arriving at the photo element 3 that corresponds to the emitted intensity $I_{out,h}$ has an intensity $I_{in,h}$ and the light arriving on the photo element 3 that corresponds to the emitted intensity $I_{out,l}$ has an intensity $I_{in,l}$.

The time difference $T_{tof}$ between $T_0$ and the first point in time when light with the intensity $I_{in,l}$ arrives at the photo element corresponds to the time of flight of the light from the emission of the light source 2 until the arrival at the photo element 3. A distance value R between the illumination device 1 and the object 10 can be calculated from $T_{tof}$ by using equation 8. FIG. 2 shows the first integration window time period 15 that has an integration start point in time $T_{sd}$ and an integration end point in time $T_{sd}+T_s$. $T_{sd}$ is chosen such that it lies between $T_{tof}$ and $T_{tof}+T_n$, and $T_{sd}+T_s$ is chosen such that it is later than $T_{tof}+T_n$. The second integration window time period 16 is shown in FIG. 3 and has an integration start point in time $T_{sd2}$ and an integration end point in time $T_{sd2}+T_{s2}$, wherein $T_{sd2}$ is chosen such that it is later than $T_{tof}+T_n$. For the first embodiment it is $T_s > T_n$ and $T_{s2} > T_n$.

FIGS. 2 and 3 depict an example embodiment in which $I_{out,l} = I_{in,l} = 0$. Therefore, the signal value U corresponds to the hatched area in FIG. 2 and the signal value $U_2$ corresponds to the hatched area in FIG. 3. As it can be seen in FIG. 2, the signal value U can be calculated by $U = T_i * I_{in}$, wherein $I_{in} = I_{in,h} - I_{in,l} = I_{in,h}$ and $T_i$ is the duration during which light arrives at the photo element 3 during its activation. By measuring the signal value $U_2$ with the second integration window time period 16, it is possible to determine the intensity $I_{in}$ according to equation 1. From the equation $T_{sd}+T_s = T_{tof}+T_n+T_i$, it is now possible to derive equation 3.

Figure 7:
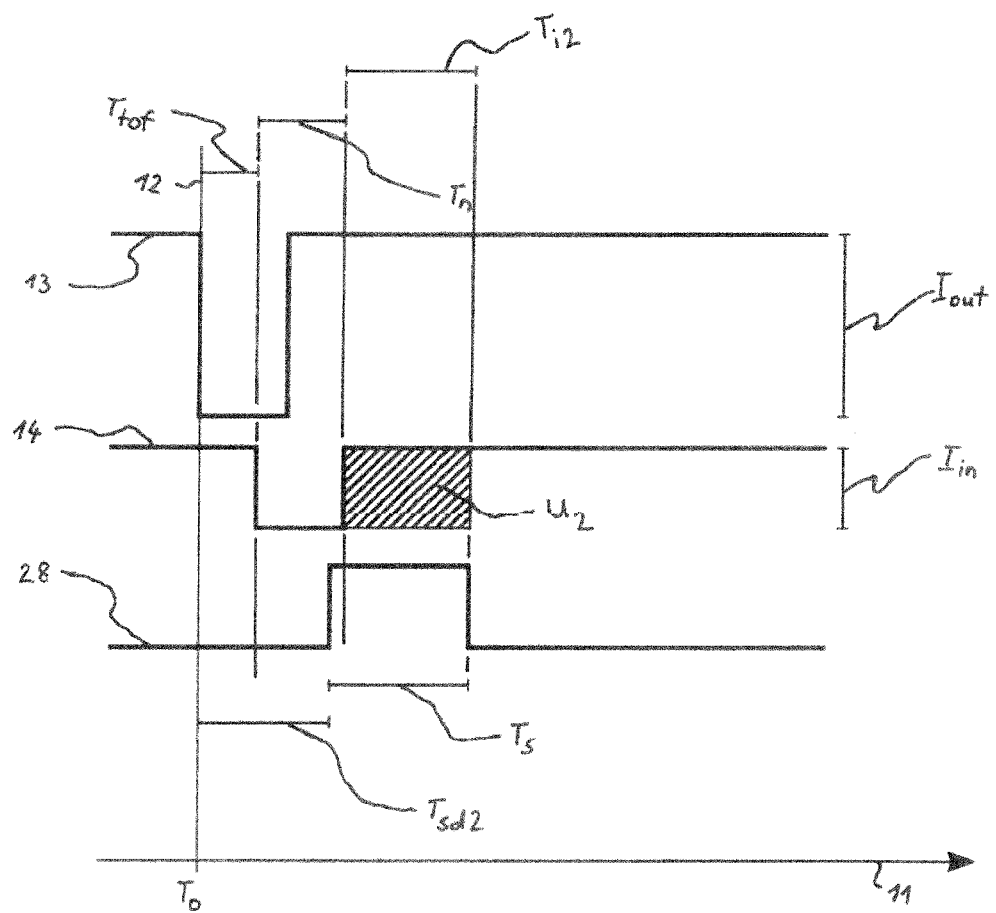

The second example embodiment according to FIGS. 2 and 7 differs from the first example embodiment according to FIGS. 2 and 3 in that the second integration window time period 28 according to FIG. 7 also splits the duration $T_n$ during which light with the lower intensity arrives on the photo element 3. Therefore, the integration start point in time $T_{sd2}$ of the second integration window time period 28 is between $T_{tof}$ and $T_{tof}+T_n$ and $T_{sd2}$ is later than $T_{sd}$. The duration $T_s$ of the first integration window time period 15 and the second integration window time period 28 is the same. Also for the second example embodiment it is $T_s > T_n$.

Figure 5:
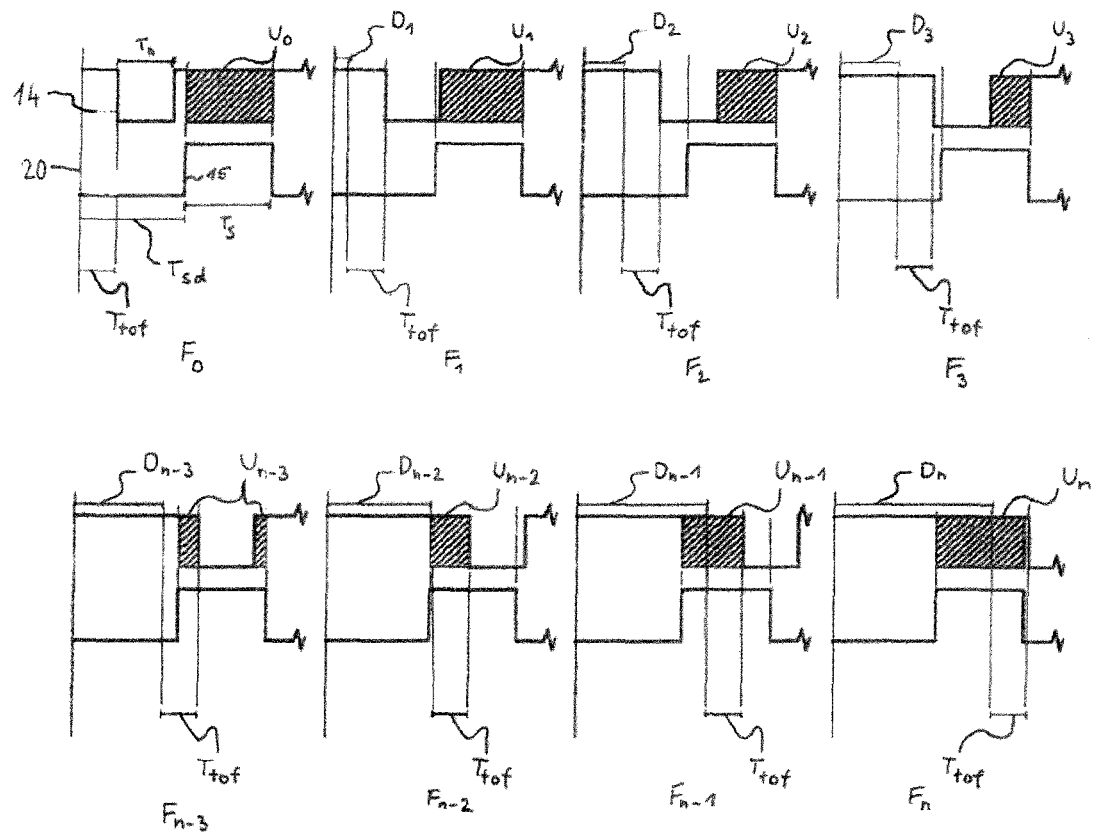
FIG. 5 shows a sequence of temporal profile diagrams with intensities and different integration window time periods according to the second example embodiment of the invention.
Figure 6:
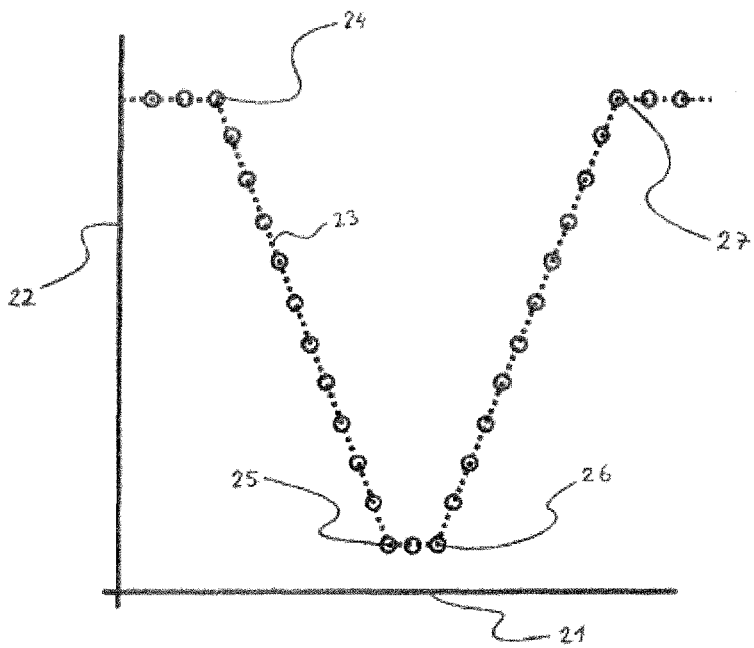
FIG. 6 shows a correlation function determined according to the third example embodiment of the invention; and, FIG. 7 shows temporal profile diagrams with intensities and an integration window time period according to the second example embodiment of the invention.

In the third example embodiment according to FIGS. 4 to 6, a sequence of signal values $U_0, U_1, U_2, \ldots U_n$ is measured in subsequent acquisition cycles $F_0, F_1, F_2, \ldots F_n$, wherein the signal value $U_x$ is measured in acquisition cycle $F_x$. Each acquisition cycle has a fixed delay $T_{sd}$ from a time zero 20, after which the photo element 3 is activated, and a variable delay $D_0, D_1, D_2, \ldots D_n$ from the time zero 20 to the point in time at which the intensity of the light source is switched from $I_{out,h}$ to $I_{out,l}$, wherein $D_x$ depicts the delay in the acquisition cycle $F_x$. FIG. 5 shows that in the acquisition cycle $F_0$ it is: $D_0 = 0$ and in each subsequent acquisition cycle D is increased. The pairs of signal values U and delays D are stored in a memory unit 17 of the illumination device 1 so that they can be further processed for determining the time of flight $T_{tof}$.

FIG. 6 shows a diagram in which the signal values U 22 are plotted versus the respective delays D 21 as determined with the trigger schemes of FIG. 5. In FIG. 5 the duration of the integration window time period $T_s$ is chosen such that it is longer than the duration $T_n$ during which the intensity of the light source is switched to the lower intensity level. The plot shows a correlation function 23 which has characteristic points 24 to 27 that can be evaluated so that $T_{tof}$ can be derived. The first point in time 24 corresponds to $D+T_{tof}+T_s$ being equal to $T_{sd}$, the second point in time 25 corresponds to $D+T_{tof}$ being equal $T_{sd}$, the third point in time 26 corresponds to $D+T_{tof}+T_n$ being equal to $T_{sd}+T_s$ and the fourth point in time 27 corresponds to $D+T_{tof}$ being equal $T_{sd}+T_s$.

In summary, in a first example embodiment, an illumination device is provided that includes a light source 2 and at least one photo element 3 adapted to capture the light emitted by the light source 2 after being reflected back from an object 10 and to output a signal value U at the end of a first integration window time period 15 and to output a signal value $U_2$ at the end of a second integration window time period 16 with the signal values U and $U_2$ being proportional to the energy of light arriving at the photo element 3 during the respective integration window time period 15, 16 and the method is carried out with the steps of: a) illuminating an object 10 with the light source 2 of the illumination device 1 and switching the light intensity of the light source 2 at a point in time $T_0$ from an intensity $I_{out,h}$ to zero as well as switching its intensity at a point in time $T_0+T_n$ back to $I_{out,h}$, wherein the light arriving at the photo element 3 that corresponds to the emitted intensity $I_{out,h}$ has an intensity $I_{in}=I_{in,h}$; b) outputting a signal value U at the end of the first integration window time period 15 of the photo element 3, wherein the first integration window time period 15 has such a predetermined delay relative to $T_0$ that $T_{tof}+T_n$ is between an integration start point in time $T_{sd}$ of the first integration window time period 15 and an integration end point in time $T_{sd}+T_s$ of the first integration window time period 15 and $T_{tof}$ is earlier than $T_{sd}$, with $T_{tof}$ being the first point in time when light with the intensity of zero arrives at the photo element 3, wherein $T_s>T_n$, b1) determining the intensity $I_{in}$ by the photo element 3 by measuring the signal value $U_2$ within the second integration window time period 16 having an integration start point in time $T_{sd2}$ and an integration end point in time $T_{sd2}+T_{s2}$, wherein $T_{sd2}$ is chosen such that it is later than $T_{tof}+T_n$, wherein $T_s>T_n$, and c) calculating a distance value R between the illumination device 1 and the object 10 by using equations 1 and 3.

In a second example embodiment, a method is carried out with the illumination device of the first example embodiment and the steps: a) illuminating an object 10 with the light source 2 of the illumination device 1 and switching the light intensity of the light source 2 at a point in time $T_0$ from an intensity $I_{out,h}$ to zero as well as switching its intensity at a point in time $T_0+T_n$ back to $I_{out,h}$, wherein the light arriving on the photo element 3 that corresponds to the emitted intensity $I_{out,h}$ has an intensity $I_{in}$; b) outputting a signal value U at the end of the first integration window time period 15 by the photo element 3, wherein the first integration window time period 15 has such a predetermined delay relative to $T_0$ that $T_{tof}+T_n$ is between an integration start point in time $T_{sd}$ of the first integration window time period 15 and an integration end point in time $T_{sd}+T_s$ of the first integration window time period 15 and $T_{tof}$ is earlier than $T_{sd}$, with $T_{tof}$ being the point in time when light with the intensity of zero arrives first at the photo element 3, wherein $T_s>T_n$, b1) outputting the signal value $U_2$ at the end of the second integration window time period (28) having an integration start point in time $T_{sd2}$ being later than $T_{sd}$ and an integration end point in time $T_{sd2}+T_s$, wherein $T_{tof}$ is between $T_{sd2}$ and $T_{sd}+T_s$ and wherein $T_{tof}+T_n$ is later than $T_{sd2}+T_s$, and c) calculating a distance value R between the illumination device 1 and the object 10 by using equation 5.

In a third example embodiment, an illumination device includes a light source 2, at least one photo element 3 configured to capture the light emitted by the light source 2 after being reflected back from an object 10 and to output a signal value U at the end of an integration window time period 15 with the signal value U being proportional to the energy of light arriving on the photo element 3 during the integration window time period 15 and a memory unit 17 configured to store pairs of signal values U and delays D and the method is carried out with the steps of: a) illuminating the object 10 with the light source 2 in a plurality of acquisition cycles, wherein in each acquisition cycle the light source 2 switches its intensity at a point in time $T_0$ from an intensity $I_{out,h}$ to zero as well as switches its intensity back to $I_{out,h}$ at the point in time $T_0+T_n$, wherein the light arriving at the photo element 3 that corresponds to the emitted intensity $I_{out,h}$ has an intensity $I_{in}$, b) forming a correlation function 23 (D, U) by increasing the delay D of the integration window time period with respect to $T_0$ in each acquisition cycle and outputting a signal value U at the end of the integration window time period 15 of each acquisition cycle, and c) determining a distance value R between the illumination device 1 and the object 10 from at least one of the points of the correlation function $f_c$ 23 that correspond to $T_{sd}+T_s$ being equal to $T_{tof}$ 24, $T_{sd}+T_s$ being equal $T_{tof}+T_n$ 25, $T_{sd}$ being equal to $T_{tof}$ 26 and $T_{sd}$ being equal $T_{tof}+T_n$ 27. It is also possible to form the arithmetic average from a plurality of, or from all of the points 24 to 27, wherein $T_s>T_n$.

It is understood that the foregoing description is that of the example embodiments of the invention and that various changes and modifications may be made thereto without departing from the spirit and scope of the invention as defined in the appended claims.

LIST OF REFERENCE NUMERALS

1 Illumination device
2 light source
3 photo element
4 trigger generator
5 activation signal for light source
6 activation signal for photo-active element
7 illumination optics
8 detection optics
9 field of view
10 object
11 time
12 intensity
13 emitted light intensity
14 light intensity arriving on the photo element
15 first integration window time period
16 second integration window time period
17 memory unit
18 data transfer photo-active element—memory unit
19 data transfer memory unit—processing unit
20 time zero
21 delay D
22 signal value U
23 correlation function
24 first point in time
25 second point in time
26 third point in time
27 fourth point in time
28 second integration window time period

What is claimed is:

1. A method for illuminating an object by an illumination device and for determining a distance value R between the object and said illumination device, wherein said illumination device includes a light source and at least one photo element, wherein said photo element is configured (a) to capture light emitted by said light source subsequent to the light being reflected back from the object, (b) to be activated during integration window time periods, and (c) to output signal values at end times of the integration window time periods, wherein the signal values are proportional to an energy of the light arriving at said photo element as said photo element is activated, the method comprising:

illuminating the object with said light source so as to allow a human user to view the object with an unaided eye;

at a first point in time $T_0$, switching a light intensity of the light source from a first light intensity $I_{out,h}$ to a second light intensity $I_{out,l}$, wherein said second light intensity $I_{out,l}$ is lower than said first light intensity $I_{out,h}$;

at a second point in time $T_0+T_n$, switching the light intensity of said light source from said second light intensity $I_{out,l}$ back to said first light intensity $I_{out,h}$, wherein the light that arrives at said photo element and that corresponds to the light emitted with said first light intensity $I_{out,h}$ has a third light intensity $I_{in,h}$ and, and wherein the light that arrives at said photo element and that corresponds to the light emitted with said second light intensity $I_{out,l}$ has a fourth light intensity $I_{in,l}$;

outputting a first signal value U at an end of a first integration window time period, wherein said first signal value U is proportional to the energy of the light arriving at said photo element during said first integration window time period, wherein said first integration window time period has a predetermined time delay relative to the first point in time $T_0$ so that either a third point in time $T_{tof}$ or a fourth point in time $T_{tof}+T_n$ lies between an integration time start point $T_{sd}$ of the first integration window time period and an integration time end point $T_{sd}+T_s$ of the first integration window time period, wherein the third point in time $T_{tof}$ is a point in time at which the light with the fourth light intensity $I_{in,l}$ first arrives at the photo element, and wherein a first duration $T_s$ of the first integration window time period is longer than a second duration $T_n$;

determining a fifth light intensity $I_{in}=I_{in,h}-I_{in,l}$ by measuring a second signal value $U_2$ by the photo element during a second integration window time period; and, calculating the distance value R from the first signal value U and the fifth light intensity $I_{in}$.

2. The method according to claim 1, wherein $T_{s2}$ is a third duration that is longer than the second duration $T_n$, and wherein the second integration window time period has a second predetermined time delay relative to the first point in time $T_0$ so that an integration time end point $T_{sd2}+T_{s2}$ of the second integration window time period is earlier than the third point in time $T_{tof}$.

3. The method according to claim 1, wherein $T_{s2}$ is a third duration that is longer than the second duration $T_n$, and wherein the second integration window time period has a second predetermined time delay relative to the first point in time $T_0$ so that an integration time start point $T_{sd2}$ of the second integration window time period is earlier than the third point in time $T_{tof}$ and an integration time end point $T_{sd2}+T_{s2}$ of the second integration window time period is later than the fourth point in time $T_{tof}+T_n$.

4. The method according to claim 1, wherein the light source comprises light emitting diodes, VCSELs and/or lasers.

5. The method according to claim 1, wherein the illumination device comprises a CCD chip with an image intensifier and/or a CMOS chip that includes the at least one photo element.

6. The method according to claim 1, wherein the second light intensity $I_{out,l}$ is zero.

7. The method according to claim 1, wherein the object is illuminated with visible light by the illumination device so as to allow the object to be viewed through a vision system.

8. The method according to claim 1, wherein $T_{s2}$ is a third duration that is longer than the second duration $T_n$, and wherein the second integration window time period has a second predetermined time delay relative to the first point in time $T_0$ so that an integration time start point $T_{sd2}$ of the second integration window time period is later than the fourth point in time $T_{tof}+T_n$.

9. A method for illuminating an object by an illumination device and for determining a distance value R between the object and said illumination device, wherein said illumination device includes a light source and at least one photo element, wherein said photo element is configured (a) to capture light emitted by said light source subsequent to the light being reflected back from the object, (b) to be activated during integration window time periods, and (c) to output signal values at end times of the integration window time periods, wherein the signal values are proportional to an energy of the light arriving at said photo element as said photo element is activated, the method comprising:

illuminating the object with said light source so as to allow a human user to view the object with an unaided eye;

at a first point in time $T_0$, switching a light intensity of the light source from a first light intensity $I_{out,h}$ to a second light intensity $I_{out,l}$, wherein said second light intensity $I_{out,l}$ is lower than said first light intensity $I_{out,h}$;

at a second point in time $T_0+T_n$, switching the light intensity of said light source from said second light intensity $I_{out,l}$ back to said first light intensity $I_{out,h}$, wherein the light that arrives at said photo element and that corresponds to the light emitted with said first light intensity $I_{out,h}$ has a third light intensity $I_{in,h}$ and, and wherein the light that arrives at said photo element and that corresponds to the light emitted with said second light intensity $I_{out,l}$ has a fourth light intensity $I_{in,l}$;

outputting a first signal value U at an end of a first integration window time period, wherein said first signal value U is proportional to the energy of the light arriving at said photo element during said first integration window time period, wherein said first integration window time period has a predetermined time delay relative to the first point in time $T_0$ so that either a third point in time $T_{tof}$ or a fourth point in time $T_{tof}+T_n$ lies between a first integration time start point $T_{sd}$ of the first integration window time period and a first integration time end point $T_{sd}+T_s$ of the first integration window time period, wherein the third point in time $T_{tof}$ is a point in time at which the light with the fourth light intensity $I_{in,l}$ first arrives at the photo element, and wherein a first duration $T_s$ of the first integration window time period is longer than a second duration $T_n$;

outputting a second signal value $U_2$ at an end of a second integration window time period having a second integration time start point $T_{sd2}$ being later than the first integration time start point $T_{sd}$ and a second integration time end point $T_{sd2}+T_s$, wherein the third point in time $T_{tof}$ lies between the second integration time start point $T_{sd2}$ and the second integration time end point $T_{sd}+T_s$, and wherein the fourth point in time $T_{tof}+T_n$ is later than the second integration time end point $T_{sd2}+T_s$; or outputting the second signal value $U_2$ at the end of the second integration window time period having the second integration time start point $T_{sd2}$ being later than the first integration time start point $T_{sd}$ and the second integration time end point $T_{sd2}+T_s$, wherein the fourth point in time $T_{tof}+T_n$ lies between the second integration time start point $T_{sd2}$ and the first integration time end point $T_{sd}+T_s$, and wherein the third point in time $T_{tof}$ is earlier than the first integration time start point $T_{sd}$; and, calculating the distance value R from the first signal value U and the second signal value $U_2$.

10. The method according to claim 9, wherein the object is illuminated with visible light by the illumination device so as to allow the object to be viewed through a vision system.

11. The method according to claim 9, wherein the light source comprises light emitting diodes, VCSELs and/or lasers.

12. The method according to claim 9, wherein the illumination device comprises a CCD chip with an image intensifier and/or a CMOS chip that includes the at least one photo element.

13. The method according to claim 9, wherein the second light intensity $I_{out,l}$ is zero.

14. A method for illuminating an object by an illumination device and for determining a distance value R between the object and said illumination device, wherein said illumination device includes a light source and at least one photo element, wherein said photo element is configured (a) to capture light emitted by said light source subsequent to the light being reflected back from the object, (b) to be activated during integration window time periods, and (c) to output signal values at end times of the integration window time periods, wherein the signal values are proportional to an energy of the light arriving at said photo element as said photo element is activated, the method comprising:

illuminating the object with said light source so as to allow a human user to view the object with an unaided eye;

at a first point in time $T_0$, switching a light intensity of the light source from a first light intensity $I_{out,h}$ to a second light intensity $I_{out,l}$, wherein said second light intensity $I_{out,l}$ is lower than said first light intensity $I_{out,h}$;

at a second point in time $T_0+T_n$, switching the light intensity of said light source from said second light intensity $I_{out,l}$ back to said first light intensity $I_{out,h}$, wherein the light that arrives at said photo element and that corresponds to the light emitted with said first light intensity $I_{out,h}$ has a third light intensity $I_{in,h}$ and, and wherein the light that arrives at said photo element and that corresponds to the light emitted with said second light intensity $I_{out,l}$ has a fourth light intensity $I_{in,l}$;

outputting a first signal value U at an end of an integration window time period, wherein said first signal value U is proportional to the energy of the light arriving at said photo element during said integration window time period, wherein said integration window time period has a predetermined time delay relative to the first point in time $T_0$ so that either a third point in time $T_{tof}$ or a fourth point in time $T_{tof}+T_n$ lies between an integration time start point $T_{sd}$ of the integration window time period and an integration time end point $T_{sd}+T_s$ of the integration window time period, wherein the third point in time $T_{tof}$ is a point in time at which the light with the fourth light intensity $I_{in,l}$ first arrives at the photo element, and wherein a first duration $T_s$ of the integration window time period is longer than a second duration $T_n$;

repeating the illuminating of the object with the light source and the switching of the light intensity of said light source at a plurality of first points in time $T_0$ and a plurality of second points in time $T_0+T_n$;

forming a correlation function $f_c$ based on the intensity of the light arriving at the photo element and the integration window time period by varying a delay D of the integration window time period relative to the first point in time $T_0$; and, calculating the distance value R from the correlation function $f_c$.

15. The method according to claim 14, wherein the distance value R is determined from at least one of a plurality of points of the correlation function $f_c$ that correspond to the integration time end point $T_{sd}+T_s$ of the integration window time period being equal to the third point in time $T_{tof}$, the integration time end point $T_{sd}+T_s$ being equal the fourth point in time $T_{tof}+T_n$, the integration time start point $T_{sd}$ of the integration window time period being equal to the third point in time $T_{tof}$, and the integration time start point $T_{sd}$ being equal to the fourth point in time $T_{tof}+T_n$.

16. The method according to claim 14, wherein the distance value R is determined from an arithmetic average of a plurality of points of the correlation function $f_c$ or from all of the points of the correlation function $f_c$ that correspond to the integration time end point $T_{sd}+T_s$ being equal to the third point in time $T_{tof}$, the integration time end point $T_{sd}+T_s$ being equal to the fourth point in time $T_{tof}+T_n$, the integration time start point $T_{sd}$ being equal to the third point in time $T_{tof}$, and the integration time start point $T_{sd}$ being equal to the fourth point in time $T_{tof}+T_n$.

17. The method according to claim 14, wherein the object is illuminated with visible light by the illumination device so as to allow the object to be viewed through a vision system.

18. The method according to claim 14, wherein the light source comprises light emitting diodes, VCSELs and/or lasers.

19. The method according to claim 14, wherein the illumination device comprises a CCD chip with an image intensifier and/or a CMOS chip that includes the at least one photo element.

20. The method according to claim 14, wherein the second light intensity $I_{out,l}$ is zero.

* * * * *